(12) United States Patent
Brown et al.

(10) Patent No.: US 11,387,634 B2
(45) Date of Patent: *Jul. 12, 2022

(54) PORTABLE HAND TOOL

(71) Applicant: Hubbell Incorporated, Shelton, CT (US)

(72) Inventors: Lawrence Norman Brown, Allenstown, NH (US); Thomas Romeo Faucher, Manchester, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/819,886

(22) Filed: Mar. 16, 2020

(65) Prior Publication Data
US 2020/0220337 A1 Jul. 9, 2020

Related U.S. Application Data

(63) Continuation of application No. 15/230,760, filed on Aug. 8, 2016, now Pat. No. 10,651,636.
(Continued)

(51) Int. Cl.
*H02G 1/00* (2006.01)
*B23D 29/00* (2006.01)
(Continued)

(52) U.S. Cl.
CPC ........... *H02G 1/005* (2013.01); *B21D 39/048* (2013.01); *B23D 29/002* (2013.01); *B25B 27/10* (2013.01); *B25H 3/006* (2013.01); *H01R 43/0427* (2013.01)

(58) Field of Classification Search
CPC ...... B21D 39/04; B21D 39/048; B23D 15/04; B23D 15/14; B23D 21/10; B23D 27/02;
(Continued)

(56) References Cited

U.S. PATENT DOCUMENTS 2,765,019 A 10/1956 Evans
3,594,073 A 7/1971 Liautaud
(Continued)

FOREIGN PATENT DOCUMENTS

DE 10110882 A1 9/2002

OTHER PUBLICATIONS

PCT International Search Report and Written Opinion dated Oct. 26, 2016 from corresponding Application No. PCT/US2016/045976, 12 pages.
(Continued)

*Primary Examiner* — Clark F Dexter
(74) *Attorney, Agent, or Firm* — Dilworth IP, LLC (57) ABSTRACT

Tools for operating on an object, such as a wire or cable are provided. The tool includes a housing and a working head assembly. The working head assembly has a movable section and fixed section secured to the housing. The movable section has a first end movably secured to a first end of the fixed section. The movable section has a second end that is releasably secured to a second end of the fixed section using a latch pin. The working head assembly also includes a latch pin stop that is positioned in the second end of the movable section. The latch pin stop is configured to prevent the latch pin from releasably securing the movable section to the fixed section until the movable section is properly aligned with the fixed section.

24 Claims, 8 Drawing Sheets

Related U.S. Application Data (60) Provisional application No. 62/202,592, filed on Aug. 7, 2015.

(51) Int. Cl.
  *B25F 5/00* (2006.01)
  *B21D 39/04* (2006.01)
  *B25H 3/00* (2006.01)
  *B25B 27/10* (2006.01)
  *H01R 43/04* (2006.01)
  *H01R 43/042* (2006.01)

(58) Field of Classification Search
  CPC ...... B23D 27/04; B23D 27/06; B23D 29/002; B23D 29/023; B25B 27/10; B25F 5/005; B25H 3/006; B26D 3/167–169; F16P 3/12; H01G 1/0005; H01R 43/042; H01R 43/0421; H01R 43/0427; H01R 43/0428
  USPC ......... 30/182, 186–188, 194, 241, 244, 245, 30/272.1, 277.4; 403/20, 27
  See application file for complete search history.

(56) References Cited

U.S. PATENT DOCUMENTS

| | | |
|---|---|---|
| 4,845,849 A | 7/1989 | Aubriot |
| 5,195,354 A | 3/1993 | Yasui et al. |
| 5,611,228 A | 3/1997 | Dummermuth |
| 6,085,422 A | 7/2000 | Hirabayashi |
| 6,101,862 A | 8/2000 | Rzasa et al. |
| 6,324,884 B1 | 12/2001 | Barjesteh et al. |
| 6,792,789 B1 | 9/2004 | Faucher |
| 7,165,439 B2 | 1/2007 | Lefavour et al. |
| 8,904,848 B2 | 12/2014 | Frenken |
| 2001/0027676 A1 | 10/2001 | Frenken |
| 2013/0042460 A1 | 2/2013 | Frenken |
| 2015/0151367 A1 | 6/2015 | Frenken |
| 2018/0006437 A1 | 1/2018 | Frenken et al. |

OTHER PUBLICATIONS

Extended European Search Report dated Mar. 27, 2019 from corresponding EP Application No. 16835742.4, 9 pages.
Examination Report in IN Patent Application No. 201827008229 dated Apr. 22, 2020.

PORTABLE HAND TOOL

FIELD OF THE INVENTION

The present disclosure relates generally to the field of portable hand tools, and more particularly, to portable hand tools with working head assemblies having one or more parts that can be separated and reconnected to perform the particular operation of the working head.

BACKGROUND

Most portable power tools are handheld tools that use electric motors to drive a working head used to perform various tasks, such as cutting, crimping, drilling, shaping, fastening, grinding, polishing, heating, etc. There is a segment of the portable tool product market that incorporates a hydraulic pump to enable the working head to apply a relatively large amount of force or pressure for a particular task. Such tools may operate with a hydraulic pump actuated by a battery powered electric motor. Battery powered hydraulic power tools are employed in numerous applications to provide an operator with a desired flexibility and mechanical advantage. For example, operators of cutting tools attempting to cut large conductors, e.g., #8 conductors and larger, benefit greatly when hydraulic power is used enabling the operator to apply greater force to quickly cut such large conductors. When cutting electrical conductors and cables, the working head assembly of the tool is typically separated so that the cutting blades of the cutting tool can surround the conductor, and then the working head assembly is reattached prior to activating the tool to perform the cutting operation. A latch pin can be used to releasably secure the parts of the working head assembly together prior to activating the tool.

SUMMARY OF THE INVENTION

The present disclosure provides a tool for operating on an object, e.g., on an electrical conductor. The tool includes a frame, and a working head assembly. The working head assembly has a movable section and fixed section secured to the frame. The movable section has a first end movably secured to a first end of the fixed section. Preferably, the first end of the movable section is pivotably secured to the first end of the fixed section. The movable section has a second end that is releasably secured to a second end of the fixed section using a latch pin. The working head assembly also includes a latch pin stop that is positioned in the second end of the movable section. The latch pin stop is configured to prevent the latch pin from releasably securing the movable section to the fixed section until the movable section is properly aligned with the fixed section. In one embodiment, the latch pin stop is a spring-loaded pressure pin.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The figures depict embodiments for purposes of illustration only. One skilled in the art will readily recognize from the following description that alternative embodiments of the structures illustrated herein may be employed without departing from the principles described herein, wherein.

DETAILED DESCRIPTION

Figures 1, 2:
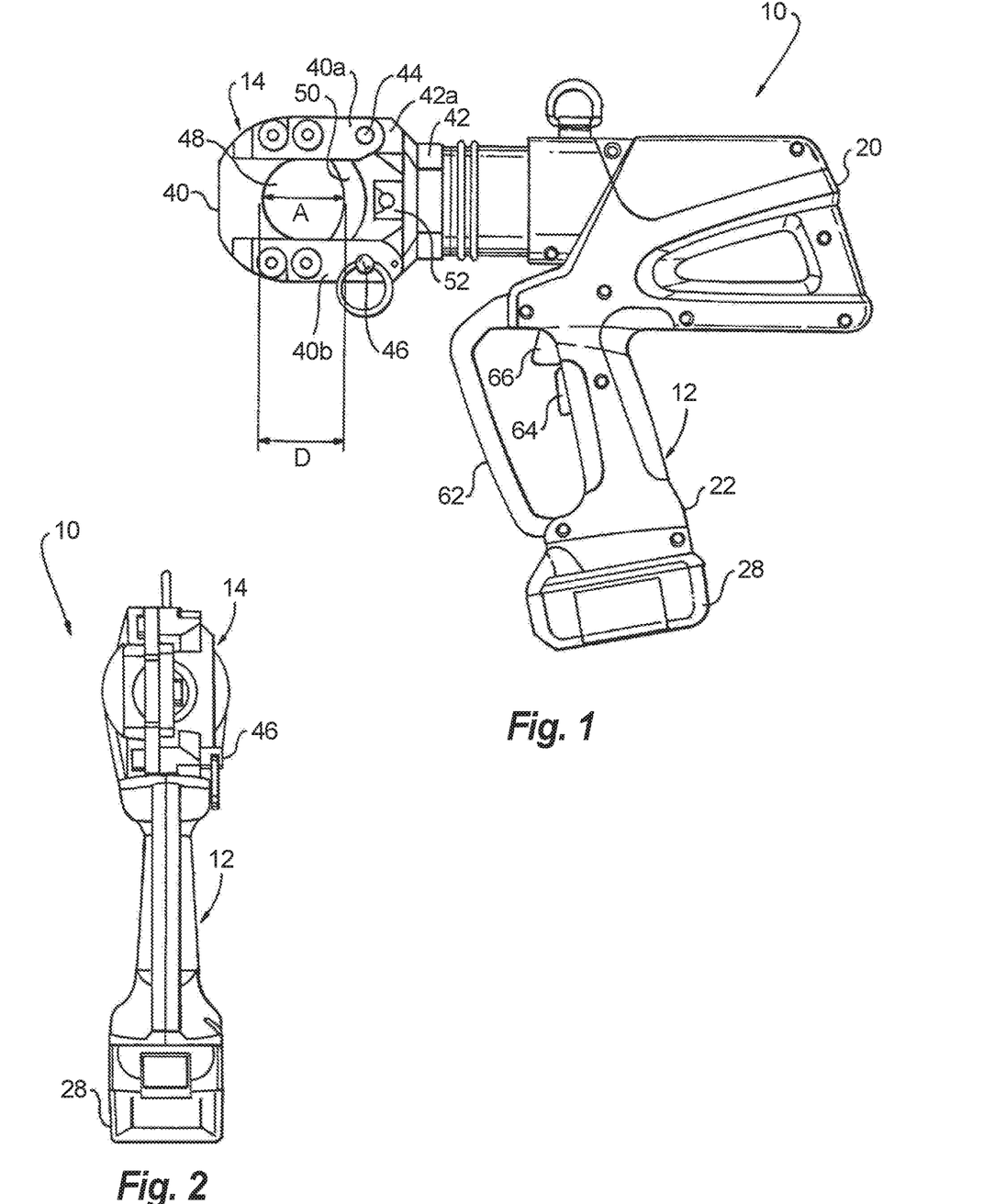
FIG. 1 is a side view of an exemplary embodiment of a portable hand tool according to the present disclosure.
FIG. 2 is a rear view of the portable hand tool of FIG. 1.

The present disclosure provides portable hand tools with a latch pin stop for ensuring proper connection of a movable section of a working head assembly of the portable hand tool relative to a fixed section of the working head assembly, and for ensuring proper operation of the working head assembly. Referring to FIG. 1, there is shown an exemplary embodiment of a portable hand tool 10 according to the present disclosure. The portable hand tool shown in the figures and described herein is a portable, hand-held, battery-operated, hydraulic cutting tool. Examples of such cutting tools that may be adapted to include the novel features of the present disclosure include the Patriot PATCUT2156-LI cutting tool (Appendix 1), and the Patriot PATCUT2156-18V cutting tool (Appendix 2), both of which are manufactured by Burndy, LLC. Although the present disclosure describes the hand tool as a portable, hand-held, battery-operated, hydraulic cutting tool, it should be understood that the tool of the present disclosure is not limited to such cutting tools. Features of the portable hand tool of the present disclosure could also be used in other types of tools, such as a battery operated, hydraulic crimping tools or any other suitable type of portable hand tool. In addition, any suitable size, shape or type of elements or materials can be used to form the shape of the tool frame. For ease of description, the portable, handheld, battery operated, hydraulic cutting tool shown and described herein is referred to as the "tool."

Figure 3:
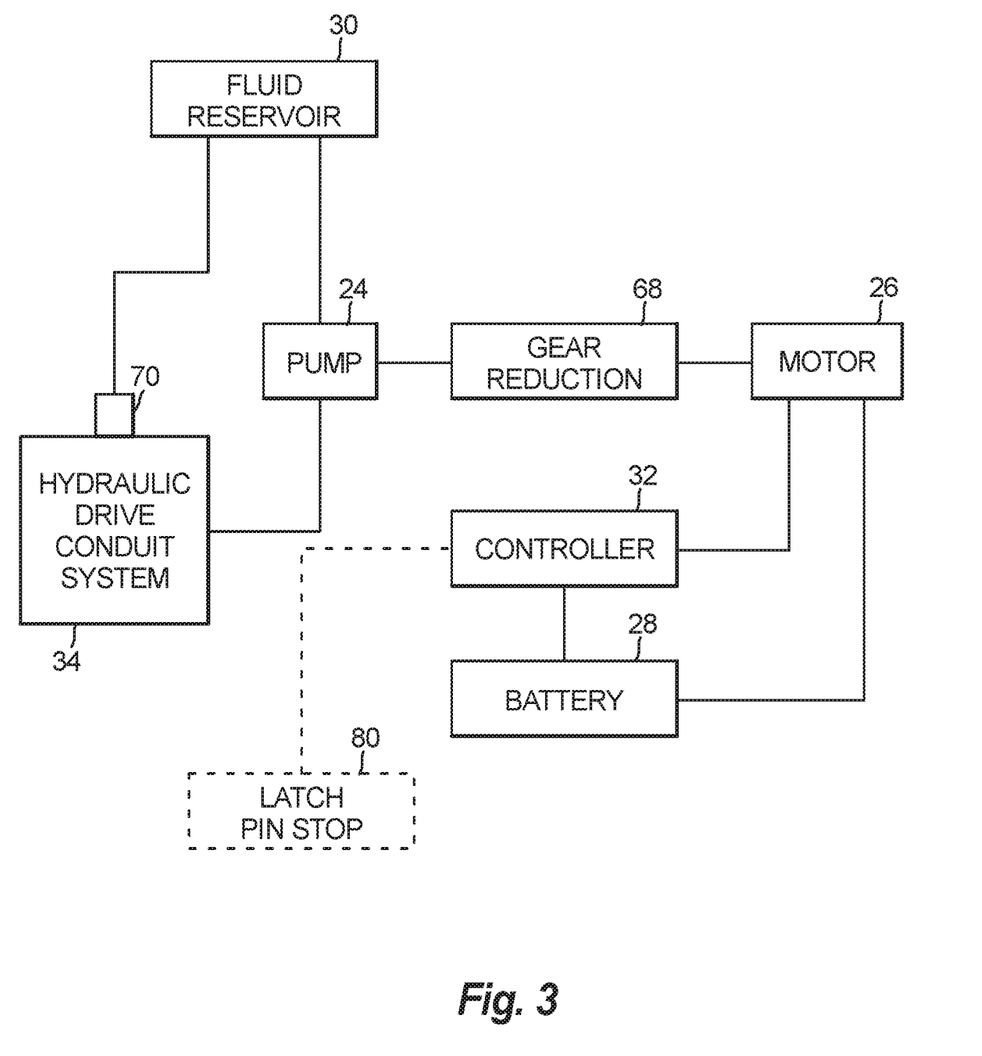
FIG. 3 is a block diagram of components in the portable hand tool of FIG. 1.

Referring to FIGS. 1-3, the tool 10 according to an exemplary embodiment of the present disclosure generally includes frame (or housing) 12 and working head assembly 14. The frame 12 includes a main body 20 and a handle 22 that form a pistol-like shape. However, the frame 12 could be in any suitable type of shape, such as an in-line shape.

The frame 12 is connected to and is used to house and support a pump 24, a motor 26, a battery 28, a fluid reservoir 30, a controller 32 and a hydraulic drive conduit system 34. The pump 24, motor 26, fluid reservoir 30, controller 32, and hydraulic drive conduit system 34 are preferably located within the main body 20 of the frame 12.

The working head assembly 14 is attached to the frame 12, and includes a movable section 40 and a fixed section 42. End 40a of the movable section 40 is secured to end 42a of fixed section 42 via a pivot pin 44 such that the movable section 40 can pivot relative to the fixed section between an open position, seen in FIG. 4, and a closed position, seen in FIGS. 1 and 7. End 40b of the movable section 40 is releasably secured to end 42b of fixed section 42 via a latch pin 46 that can be positioned within mounting holes 40c (seen in FIG. 4) in end 40b of the movable section 40 and mounting holes 42c (seen in FIG. 4) in end 42b of the fixed section 42. The fixed section 42 is connected to the front end of the frame 12 and fixed or locked in position, or in some embodiments, the fixed section 42 may be rotatably connected to the frame 12.

As noted above, in this exemplary embodiment the tool 10 is a cutting tool, such that the working head assembly 14 includes cutting blades capable of cutting electrical conductors and cables, including heavy gauge electrical conductors and cables. In this exemplary embodiment, the movable section 40 of the working head assembly 14 includes a fixed cutting blade 48, and the fixed section 42 of the working head assembly 14 includes a movable cutting blade 50. The movable cutting blade 50 is attached to a ram 52 that is part of the hydraulic drive conduit system 34. The ram 52 is movably connected to the fixed section 42 of the working head 14, and adapted to move forward and backward as indicated by arrow "A" seen in FIG. 1. The hydraulic drive conduit system 34 is connected between the pump 24 and the rear end of the ram 52. Hydraulic fluid pumped by the pump 24 through the hydraulic drive conduit system 34 and against the end of the ram 52 causes the ram to move forward toward a distal end of the working head assembly 14, i.e., toward the fixed cutting blade 48. The tool 10 preferably includes a spring (not shown) which is adapted, as is known in the art, to return the ram 52 to its rearward (or home) position when hydraulic fluid is removed from the rear end of the pressure ram 52. The ram 52 has a rear end diameter of about 2 inches. However, the diameter of the rear end of the ram could have any suitable size or shape for functioning as a hydraulic fluid contact surface. In the exemplary embodiment shown in FIG. 1, the ram 52 is adapted to move a distance "D" between its home position and its forward position which is towards the distal end of the working head assembly 14. The distance "D" can be any distance suitable to perform the desired action of the working head assembly 14, here the desired cutting action. For example, the distance "D" could be between about 1 inch and about 2 inches.

Continuing to refer to FIGS. 1 and 2, the handle 22 of the frame 12 may include a hand guard 62 to protect an operator's hand while operating the tool 10. The handle 22 includes one or more operator controls, such as trigger switches 64 and 66 that are operatively connected to the controller 32 and/or the motor 26, and can be activated by an operator by, for example, pressing the trigger switches. The operator controls, e.g., trigger switches 64 and 66, are operably coupled to the controller 32, as will be described below. As shown in FIGS. 1 and 2, the battery 28 is removably connected to the bottom of the handle 22. In another embodiment, the battery 28 can be removably mounted or connected to any suitable position on the frame 12. In another embodiment, the battery 28 may be affixed to the tool 10 so that it is not removable. The battery 28 is preferably a rechargeable battery, such as a lithium ion battery, that can output a voltage of at least 16 volts, and preferably in the range of between about 16 VDC and about 24 VDC. In the exemplary embodiment shown in FIGS. 1 and 2, the battery 28 can output a voltage of about 18 VDC.

The motor 26 is coupled to the battery 28 and the controller 32, and its operation is controlled by the controller 32, which will be described in more detail below. Generally, the motor 26 is adapted to operate at a nominal voltage corresponding to the voltage of the battery 28, i.e., between about 16 volts and about 24 volts. For example, if the battery 28 is adapted to output a voltage of about 18 volts, then the motor 26 would be adapted to operate at a voltage of about 18 volts. Under a no-load condition, such a motor 26 can operate at about 19,500 rpm with current of about 2.7 amps. At maximum efficiency, the motor 26 can operate at about 17,040 rpm with a current of about 18.7 amps, a torque of about 153 mN-m (1560 g-cm), and an output of about 273 W. An example of such an 18-volt motor 26 is the RS-775WC-8514 motor, manufactured by Mabuchi Motor Co., Ltd. of Chiba-ken, Japan. However, as noted above, any suitable type of motor adapted to operate above a 16 V nominal voltage could be used. For example, the motor may be a RS-775VC-8015 motor, also manufactured by Mabuchi Motor Co., Ltd., which has a nominal operating voltage of about 16.8 volts. As another example, the motor may be a motor adapted to operate at a 24 V nominal voltage. The output shaft of the motor 26 is connected to the pump 24 by a gear reduction or gearbox 68, and is used to activate the hydraulic drive system. Any suitable type of gear reduction assembly could be provided.

Referring again to FIG. 3, the tool 10 may include a poppet valve 70 connected to the hydraulic drive conduit system 34. The poppet valve 70 is adapted to open when the conduit system 34 reaches a predetermined pressure, such as between about 8000 and about 11,000 psi. When the poppet valve opens, hydraulic fluid being pumped by the pump 24 can exit the conduit system 34 and return to the fluid reservoir 30. The poppet valve 70 can be adapted to generate an audible sound when it opens. This audible sound can signal to the operator that the tool 10 has reached its maximum predetermined hydraulic pressure and, thus, the action of the working head 14, e.g., cutting action, has completed.

In the exemplary embodiment shown in FIG. 3, the controller 32 is adapted to sense a current drop of electricity to the motor 26. When the poppet valve 70 opens, resistance to rotation of the motor 26 is reduced such that the motor draws less current. The controller 32 senses this current drop via a current sensor (not shown), and automatically deactivates the motor 26 for a predetermined period of time. In a preferred embodiment, the predetermined period of time is between about 2 seconds and about 3 seconds. However, any suitable predetermined period of time could be set. In an alternate embodiment, the controller 32 could be adapted to deactivate the motor 26 until a reset button or reset-like procedure is performed by the operator. With this type of system, an operator can sense via a tactile sense, that the motor 26 and pump 24 have stopped and would not need to rely on an audible signal being heard or a visual signal from, for example, an LED positioned on the tool 10. More detailed information of this exemplary embodiment of the tool 10 and its operation can be found in U.S. Pat. No.

7,165,439, titled "Battery Powered Hydraulic Tool," which is incorporated herein by reference.

Figure 4:
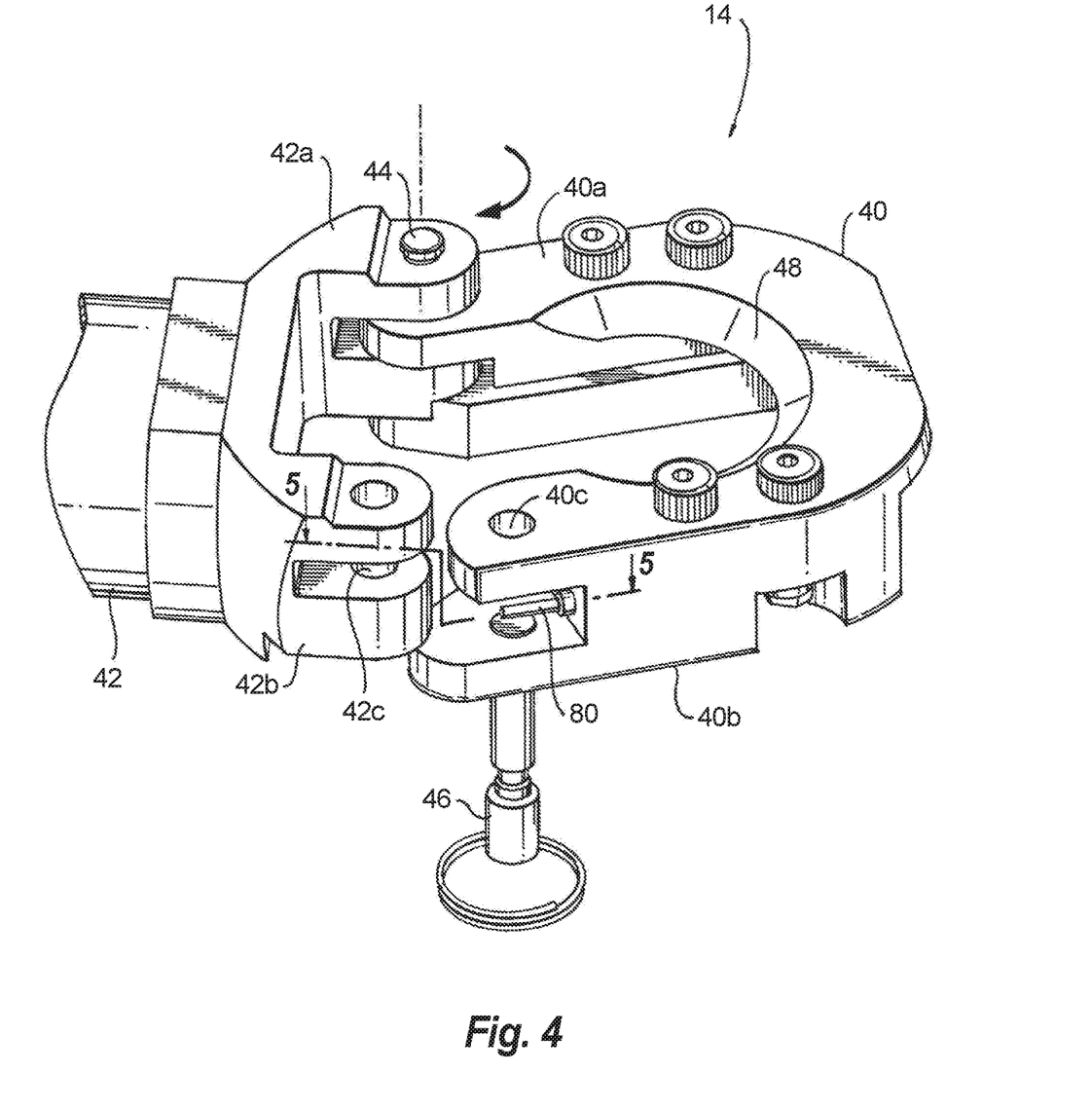
FIG. 4 is a perspective view of an exemplary embodiment of a working head assembly for the portable hand tool of FIG. 1.
Figure 5:
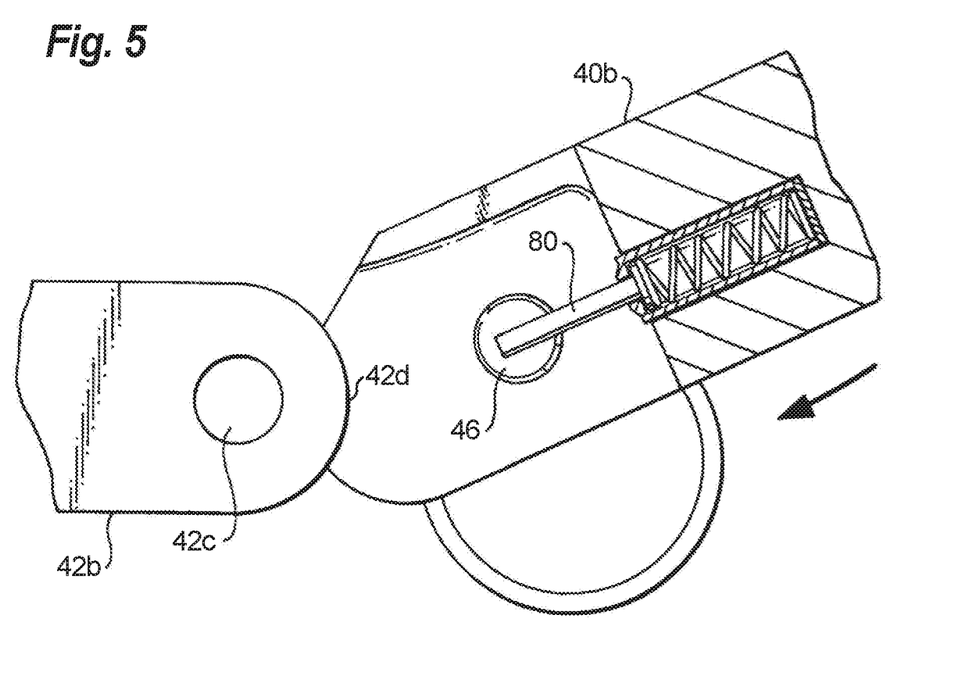
FIG. 5 is a side sectional view a portion of the working head assembly of FIG. 4, illustrating an exemplary embodiment of a latch pin stop according to the present disclosure.
Figure 6:
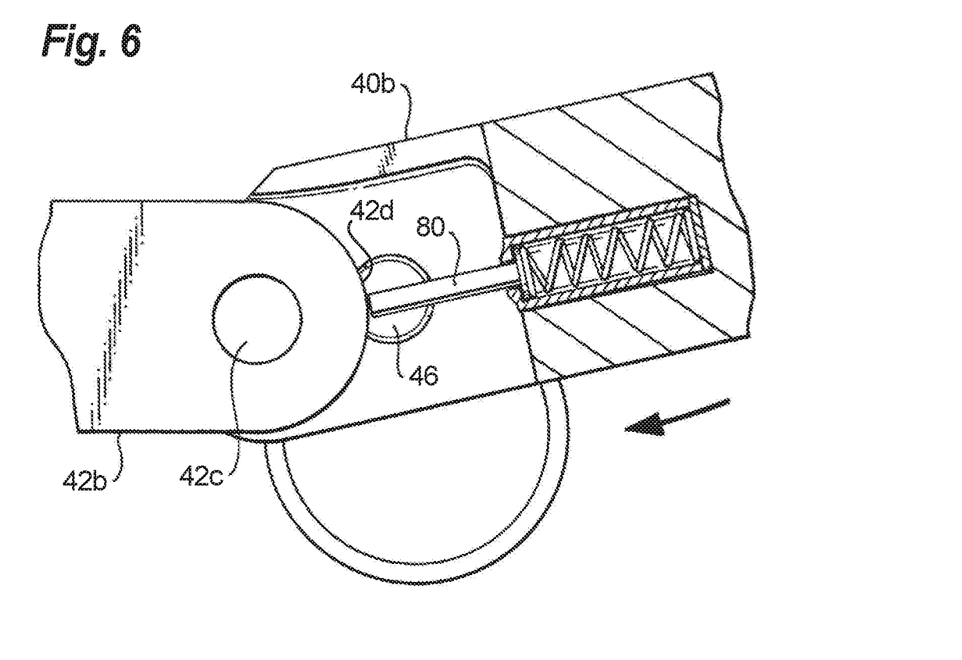
FIG. 6 is a side sectional view of the portion of the working head assembly of FIG. 4, illustrating a movable section of the working head assembly having a latch pin stop according to the present disclosure, where the latch pin stop is in an extended blocking position.
Figure 7:
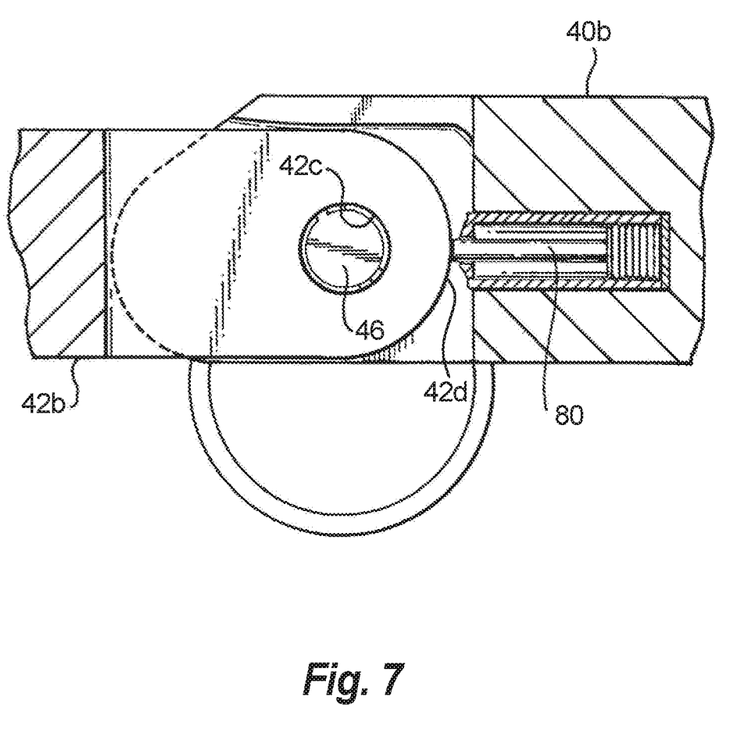
FIG. 7 is a side sectional view of the portion of the working head assembly of FIG. 4, illustrating the movable section of the working head assembly connected to a fixed portion of the working head assembly and the latch pin stop in a retracted position.

Referring to FIGS. 4-7, an exemplary embodiment of the working head assembly 14 of the tool 10 is shown. As noted above, the working head assembly 14 has the movable section 40 and the fixed section 42, wherein the fixed section 42 is secured to the frame 12 and the first end 40*a* of the movable section 40 that is pivotably secured to the first end 42*a* of the fixed section 42 and the second end 40*b* of the movable section 40 is releasably secured to the second end 42*b* of the fixed section 42 via the latch pin 46. The movable section 40 is movable between an open position where, for example, an electrical conductor can be placed between the blades 48 and 50 of the cutting tool, and a closed position where the tool can be activated to perform its designed operation, here a cutting operation. The working head assembly 14 according to the present disclosure also includes a latch pin stop 80 that prevents the latch pin 46 from being inserted into the mounting holes (apertures) 40*c* and 42*c* unless the movable section 40 is properly positioned or aligned relative to the fixed section 42. The movable section 40 is properly positioned with the fixed section 42 when the apertures 40*c* and 42*c* are substantially axially aligned such that the latch pin 46 is free to pass through both apertures 40*c* and 42*c*. More specifically, when the movable section 40 is disconnected from the fixed section 42 by removing the latch pin 46 from mounting holes 40*c* and 42*c*, and separating the movable section from the fixed section, the latch pin stop 80 automatically extends to an active position where the latch pin stop can block insertion of the latch pin into the aperture 40*c* without extending through aperture 42*c*, as seen in FIGS. 4 and 5. When the movable section is positioned for attachment to the fixed section, seen in FIG. 6, the latch pin stop engages wall 42*d* of the fixed section 42. As the moveable section 40 is further inserted into position for attachment to the fixed section 42, the latch pin stop 80 moves to a retracted position such that the latch pin stop no longer inhibits insertion of the latch pin 46 into the mounting holes 40*c* and 42*c*, and the movable section 40 can then be releasably secured to the fixed section 42 via the latch pin 46, as seen in FIG. 7. In some embodiments the latch pin stop 80 is a detent pin. In some embodiments the detent pin is spring-loaded. In the embodiment shown in FIGS. 4-7, the latch pin stop is a spring-loaded pressure pin that is normally biased in the extended position.

Figure 8:
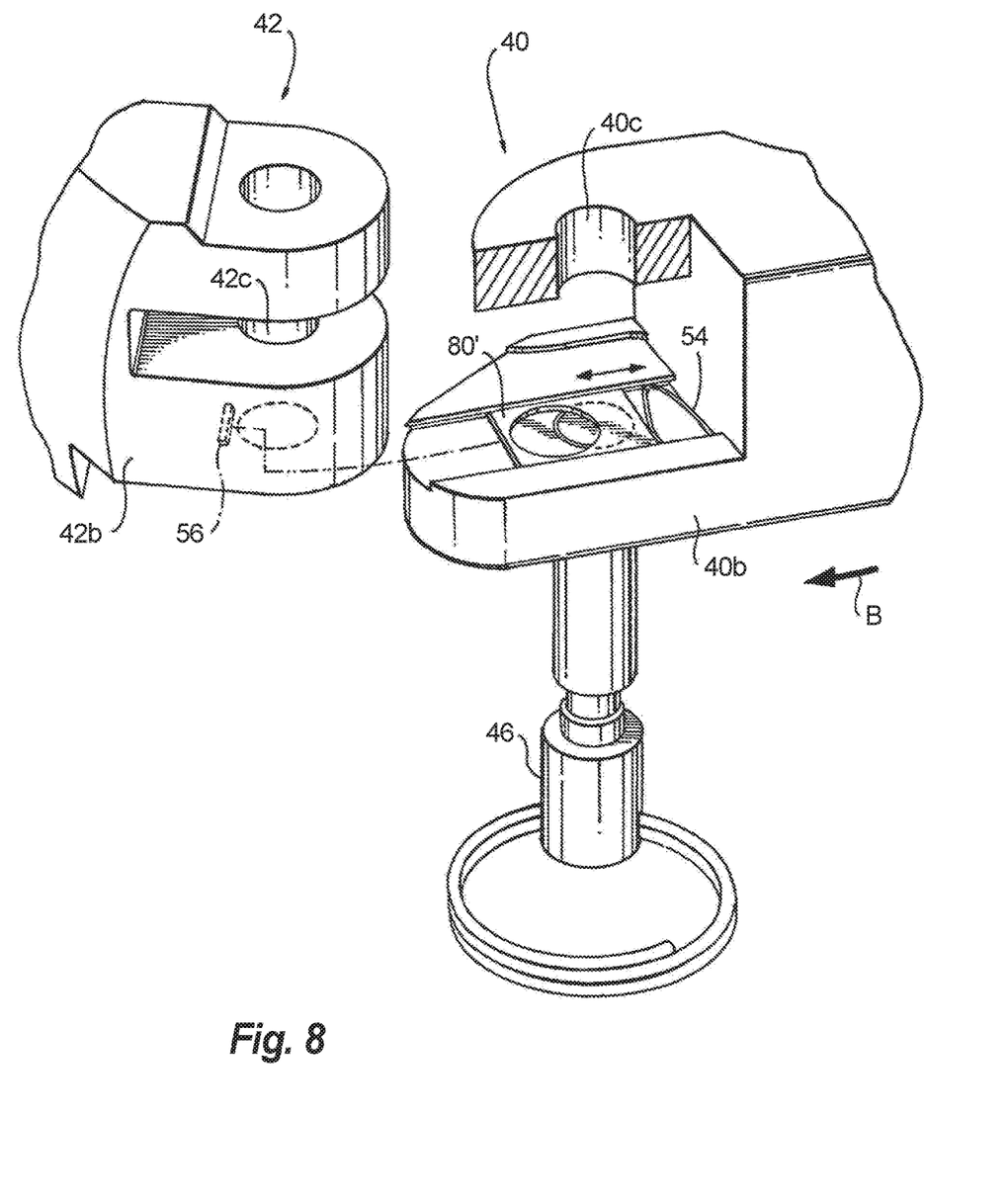
FIG. 8 is a perspective view of a working head assembly similar to FIG. 4, and illustrating another exemplary embodiment of the latch pin stop according to the present disclosure.

Referring to FIG. 8, another embodiment of the latch pin stop is shown. In this exemplary embodiment, the latch pin stop includes an extendable sliding keyhole type window 80'. In some embodiments, the sliding keyhole type window 80' has an aperture shaped like a keyhole, however, the aperture is not limited to any particular shape as long as it includes a round aperture corresponding to mounting hole 40*c*, as shown in FIG. 8. The window 80' would normally extend by sliding in the direction of arrow "B", biased by a spring 54, over the mounting hole 40*c*, when the movable section 40 of the working head assembly 14 is in the open position. As a result, the keyhole type opening would not be aligned with the mounting hole 40*c* and would thus inhibit the latch pin 46 from entering the mounting hole 40*c* until the movable section 40 of the working head assembly 14 is in the closed position, where a biasing arm 56 would cause the latch pin stop 80' to move in a direction opposite direction "B". Once the movable section 40 is aligned with the fixed section 42 of the working head assembly 14, the round area of the keyhole type opening in the latch pin stop 80' would allow the latch pin 46 to pass through the latch pin stop 80' and the mounting holes 40*c* and 42*c*.

Figure 9:
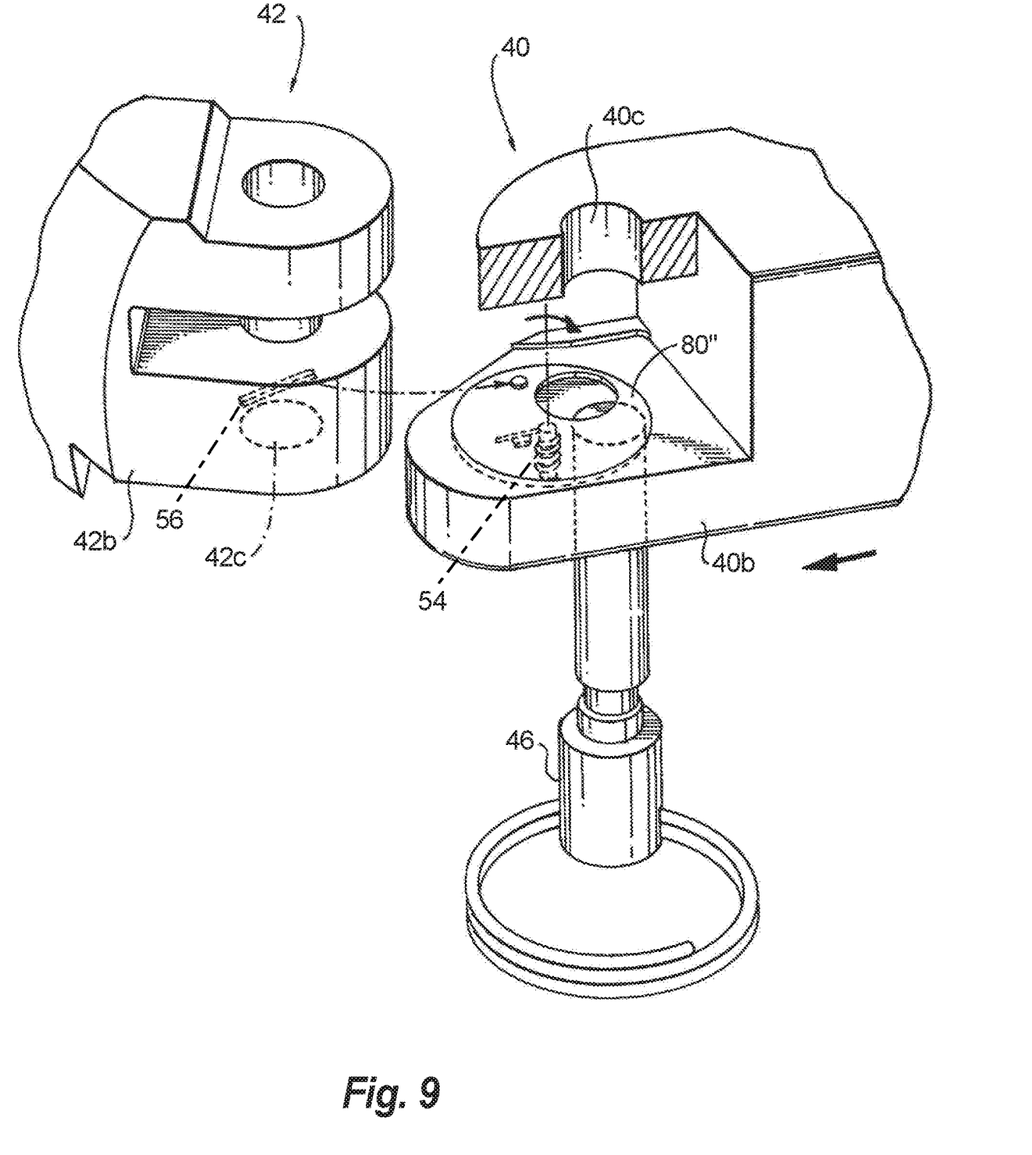
FIG. 9 is a perspective view of a working head assembly similar to FIG. 4, and illustrating another exemplary embodiment of the latch pin stop according to the present disclosure.

Referring to FIG. 9, another embodiment of the latch pin stop is shown. In this exemplary embodiment, the latch pin stop includes an extendable rotating keyhole type window 80". The window 80" would normally rotatably extend by rotating clockwise, biased by a spring 54, over the mounting hole 40*c*, when the movable section 40 of the working head assembly 14 is in the open position as shown in FIG. 9. As a result, the smaller portion of the opening would inhibit the latch pin 46 from entering the mounting hole 40*c* until the movable section 40 of the working head assembly 14 is in the closed position, where a biasing arm 56 would cause the latch pin stop 80" to rotate clockwise. Once the movable section 40 is aligned with the fixed section 42 of the working head assembly, the larger area of the opening would allow the latch pin 46 to pass through the mounting holes 40*c* and 42*c*.

Additional examples of exemplary embodiments of the latch pin stop include; a rigid window or blade structure that toggles between a normally closed position and an open position when the blade structure engages the fixed section so that the latch pin can pass through mounting holes 40*c* and 42*c*. In another exemplary embodiment, the latch pin stop can be a magnetically operated stop that normally blocks the passage of the latch pin into the mounting holes, and when end 40*b* of movable section 40 is moved in position for attachment to end 42*b* of fixed section 42 a magnetic field causes the latch pin stop to move such that the stop does not block passage of the latch pin into the mounting holes. In another embodiment, the latch pin stop 80 may be electrically connected to the controller 32, such that when the latch pin stop is in the extended position, seen in FIG. 4, the controller 32 disables the motor 26 so that the working head assembly 14 of the tool 10 cannot be activated.

Figure 10:
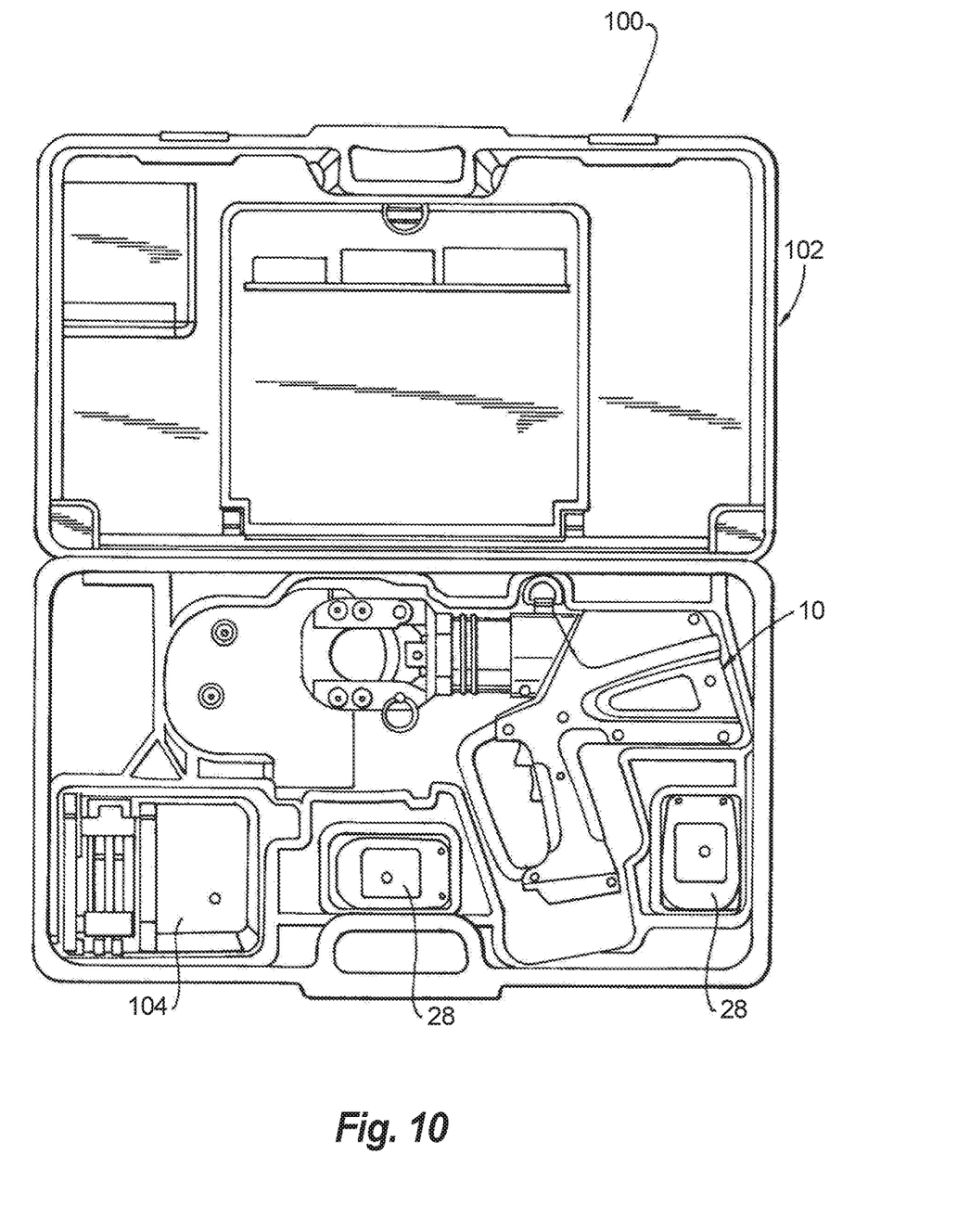
FIG. 10 is a top plan view of a tool kit according to the present disclosure, illustrating a carrying case, the portable hand tool of FIG. 1, a battery charger and two batteries.

Referring now to FIG. 10, an exemplary tool kit according to the present disclosure is provided. In this exemplary embodiment, the tool kit 100 includes a case 102 configured to house the tool 10, a battery charger 104 and one or more batteries 28.

In some embodiments, a tool for operating on an object is disclosed that includes a frame and a working head assembly having a movable section and fixed section, wherein the fixed section is secured to the frame, and wherein the movable section has a first end movably secured to a first end of the fixed section and a second end of the movable section is releasably secured to a second end of the fixed section using a latch pin. The tool also includes a latch pin stop extensibly positioned in the second end of the movable section and configured to prevent the latch pin from securing the second end of the movable section to the second end of the fixed section unless an aperture in the second end of the movable section is axially aligned with an aperture in the second end of the fixed section.

In some embodiments, a tool for operating on an object is disclosed that includes a frame and a working head assembly having a movable section and fixed section, wherein the fixed section is secured to the frame, and wherein the movable section has a first end movably secured to a first end of the fixed section and a second end of the movable section is releasably secured to a second end of the fixed section using a latch pin. The tool also includes a latch pin stop extensibly positioned in the second end of the movable section, wherein the latch pin stop blocks the latch pin from extending through an aperture in the second end of movable section unless the latch pin is extending through an aperture in the second end of the fixed section.

In some embodiments, a tool for cutting an electrical cable is disclosed that includes a frame, wherein the frame is connected to a motor, the motor is connected by a shaft to a hydraulic fluid pump, the hydraulic fluid pump is coupled to a fluid reservoir and a hydraulic drive conduit system. The tool also includes a working head assembly having a movable section and fixed section, wherein the fixed section is secured to the frame, and wherein the movable section has a first end pivotably secured to a first end of the fixed section and a second end of the movable section is releasably secured to a second end of the fixed section using a latch pin. The tool further includes a latch pin stop extensibly positioned in the second end of the movable section and configured to prevent the latch pin from securing the second end of the movable section to the second end of the fixed section unless an aperture in the second end of the movable section is axially aligned with an aperture in the second end of the fixed section, wherein the latch pin stop is one of a spring-loaded pressure pin and a spring-loaded detent pin.

The foregoing specification provides a description with reference to specific exemplary embodiments. The specification and drawings are to be regarded in an illustrative sense rather than a restrictive sense. Various modifications may be made thereto without departing from the spirit and scope as set forth in the following claims.

What is claimed is:

1. A tool, comprising:
   a working head assembly including a first section and a second section, the first section having a latch portion with a pair of aligned mounting holes releasably securable to a latch portion of the second section having at least one mounting hole;
   a latch pin removably extendable through the pair of aligned mounting holes and through the at least one mounting hole; and
   a latch pin stop positioned in said working head assembly and extendable between a retracted position and an extended position, wherein said latch pin stop is in the extended position when said latch pin stop is at least partially disposed between the pair of aligned mounting holes preventing said latch pin from extending from a first one of the pair of aligned mounting holes to a second one of the pair of aligned mounting holes.

2. The tool according to claim 1, wherein said latch pin stop is in the retracted position when the latch portion of the second section is at least partially disposed between the pair of aligned mounting holes of the latch portion of the first section.

3. The tool according to claim 2, wherein said latch pin stop is a spring-loaded pin.

4. The tool according to claim 2, wherein said latch pin stop is one of a sliding keyhole window or a rotating keyhole window.

5. The tool according to claim 1, wherein each of the first and second sections has a pivot portion, the pivot portion of the first section being rotatably secured to the pivot portion of the second section.

6. The tool according to claim 5, further comprising a pivot pin extending through the pivot portions of the first and second sections to rotatably secure the pivot portion of the first section to the pivot portion of the second section.

7. The tool according to claim 1, wherein the at least one mounting hole of the second section is a pair of aligned mounting holes.

8. The tool according to claim 1, further comprising a housing attached to said working head assembly, a motor and a controller within said housing, and a battery removably connected to said housing, wherein the motor is electrically coupled to the controller and the battery.

9. The tool according to claim 8, further comprising a hydraulic fluid pump and a fluid reservoir within said housing, wherein the hydraulic fluid pump is connected to the fluid reservoir.

10. The tool according to claim 9, further comprising a hydraulic drive conduit system and a poppet valve between the hydraulic drive conduit system and the fluid reservoir.

11. The tool according to claim 10, wherein the poppet valve opens at a predetermined pressure allowing hydraulic fluid to flow from the hydraulic drive conduit system to the fluid reservoir.

12. The tool according to claim 8, wherein said housing includes a handle with a trigger switch operatively connected to the controller for controlling the motor.

13. The tool according to claim 1, further comprising a cutting blade fixed to one of the first or second sections of said working head assembly.

14. The tool according to claim 1, wherein said working head assembly includes a ram moveable along an axis within said working head assembly.

15. The tool according to claim 14, further comprising:
   a hydraulic fluid reservoir;
   a hydraulic fluid pump connected to said hydraulic fluid reservoir; and
   a hydraulic drive conduit system, wherein said hydraulic drive conduit system is connected between said hydraulic fluid pump and a proximal end of the ram, wherein said hydraulic fluid pump pumps hydraulic fluid from said hydraulic fluid reservoir, through said hydraulic drive conduit system, and against the proximal end of the ram to move the ram along the axis.

16. The tool according to claim 15, further comprising a housing attached to said working head assembly, wherein said hydraulic fluid reservoir, said hydraulic fluid pump, and said hydraulic drive conduit system are within said housing.

17. The tool according to claim 16, further comprising a cutting blade attached to a distal end of the ram.

18. A cable cutting tool, comprising:
   a housing including a motor;
   a working head assembly attached to said housing, said working head assembly including a first section and a second section, the first section having a latch portion with a pair of aligned mounting holes releasably securable to a latch portion of the second section having at least one mounting hole;
   a latch pin removably extendable through the pair of aligned mounting holes and through the at least one mounting hole;
   a latch pin stop positioned in said working head assembly and extendable between a retracted position and an extended position, wherein said latch pin stop is in the extended position when said latch pin stop is at least partially disposed between the pair of aligned mounting holes preventing said latch pin from extending from a first one of the pair of aligned mounting holes to a second one of the pair of aligned mounting holes;
   a first cutting blade fixed to one of the first or second sections of said working head assembly; and
   a second cutting blade actuated by the motor to move towards and away from said first cutting blade.

19. The tool according to claim 18, further comprising a battery removably connected to said housing.

20. The tool according to claim 18, wherein said housing includes a handle and a trigger switch, the trigger switch operatively connected to the motor for activating the motor to displace said second cutting blade.

21. The tool according to claim 18, wherein said latch pin stop is a spring-loaded pin.

22. The tool according to claim 18, wherein said latch pin stop is one of a sliding keyhole window or a rotating keyhole window.

23. The tool according to claim 18, wherein each of the first and second sections has a pivot portion, the pivot portion of the first section being rotatably secured to the pivot portion of the second section.

24. The tool according to claim 18, wherein the at least one mounting hole of the second section is a pair of aligned mounting holes.

* * * * *